(12) United States Patent
Kobayashi et al.

(10) Patent No.: US 11,718,171 B2
(45) Date of Patent: Aug. 8, 2023

(54) SADDLED VEHICLE

(71) Applicant: Honda Motor Co., Ltd., Tokyo (JP)

(72) Inventors: Shinji Kobayashi, Inagi (JP); Yoshiaki Nakashima, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 578 days.

(21) Appl. No.: 16/292,837

(22) Filed: Mar. 5, 2019

(65) Prior Publication Data

US 2019/0299773 A1    Oct. 3, 2019

(30) Foreign Application Priority Data

Mar. 30, 2018  (JP) .............................. JP2018-068094

(51) Int. Cl.
 *B60K 15/03*    (2006.01)
 *B60K 15/07*    (2006.01)
 (Continued)

(52) U.S. Cl.
 CPC ............ *B60K 15/035* (2013.01); *B60K 15/07* (2013.01); *B60K 15/073* (2013.01); *B62J 35/00* (2013.01);
 (Continued)

(58) Field of Classification Search
 CPC .... B60K 15/035; B60K 15/07; B60K 15/073; B62J 35/00; B62J 37/00; F02M 25/08; F02M 33/02
 (Continued)

(56) References Cited

U.S. PATENT DOCUMENTS 5,060,620 A * 10/1991 Oslapas ............. F02M 25/0854
                                                    123/519
6,308,987 B1 * 10/2001 Mitake ............. B60K 15/03504
                                                    280/834
(Continued)

FOREIGN PATENT DOCUMENTS

EP    2 206 910 A1    7/2010
EP    3 053 817 A1    8/2016
(Continued)

OTHER PUBLICATIONS

Extended European Search Report dated Sep. 3, 2019, for European Application No. 19164818.7.

*Primary Examiner* — Hung Q Nguyen
*Assistant Examiner* — Johnny H Hoang
(74) *Attorney, Agent, or Firm* — Birch, Stewart, Kolasch & Birch, LLP (57) ABSTRACT

It is intended to enable a saddled vehicle, including an internal combustion engine supported by a lower part of a vehicle body frame, a fuel tank supported by an upper part of the vehicle body frame, a canister including an external air introducing pipe for introducing an external air, and a vehicle body cover covering the vehicle body frame, the internal combustion engine and the fuel tank, to efficiently discharge steam, released from the external air introducing pipe of the canister, to the outside of the vehicle. An external air introducing tubular pathway extends inside the vehicle body cover while continuing at one end thereof to the external air introducing pipe of the canister. An other end-side opened portion of the external air introducing tubular pathway is opened to the outside of the vehicle body cover while penetrating a through hole formed in the vehicle body cover.

19 Claims, 8 Drawing Sheets

(51) Int. Cl.
  *B60K 15/035*  (2006.01)
  *B60K 15/073*  (2006.01)
  *B62J 37/00*  (2006.01)
  *B62J 35/00*  (2006.01)
  *B60K 15/063*  (2006.01)
(52) U.S. Cl.
  CPC ..... *B62J 37/00* (2013.01); *B60K 2015/03473* (2013.01); *B60K 2015/0636* (2013.01); *B60Y 2200/124* (2013.01)
(58) Field of Classification Search
  USPC .................................................. 123/518–521
  See application file for complete search history.

(56) References Cited

U.S. PATENT DOCUMENTS

| | | | | |
|---|---|---|---|---|
| 7,438,058 B2* | 10/2008 | Ito | .................... | F02M 25/0872 123/518 |
| 8,448,737 B2* | 5/2013 | Hasegawa | .............. | B62K 19/46 180/219 |
| 8,726,888 B2* | 5/2014 | Yoshida | .................. | B62J 37/00 123/519 |
| 9,809,110 B2* | 11/2017 | Nakamura | ........... | F02M 25/089 |
| 10,315,511 B2* | 6/2019 | Hayashi | ........... | B60K 15/03519 |
| 2010/0051369 A1* | 3/2010 | Kuramochi | .............. | B62J 35/00 180/69.4 |
| 2010/0224172 A1* | 9/2010 | Kusa | ........................ | B62J 35/00 123/520 |
| 2010/0242925 A1 | 9/2010 | Yoshida et al. | | |
| 2010/0243353 A1* | 9/2010 | Inaoka | .................... | B62J 37/00 180/68.3 |
| 2010/0243355 A1* | 9/2010 | Hosoya | .................... | B62J 37/00 180/69.4 |
| 2011/0239994 A1 | 10/2011 | Hirukawa | | |
| 2012/0199408 A1* | 8/2012 | Hayashi | .................. | B62J 37/00 180/219 |
| 2013/0075181 A1* | 3/2013 | Ashida | .................... | B62J 37/00 180/230 |
| 2017/0089303 A1 | 3/2017 | Kurata | | |
| 2018/0179992 A1* | 6/2018 | Morita | .................... | B62J 35/00 |

FOREIGN PATENT DOCUMENTS

JP          6145486 B2    6/2017
WO    WO 2015/199106 A1    12/2015

* cited by examiner

SADDLED VEHICLE

BACKGROUND

1. Technical Field

The present invention relates to a saddled vehicle including a vehicle body frame, an internal combustion engine, a fuel tank, a canister and a vehicle body cover. The vehicle body frame includes, at a front end thereof, a head pipe supporting a steering handle so as to make the steering handle steerable. The internal combustion engine is supported by a lower part of the vehicle body frame. The fuel tank is supported by an upper part of the vehicle body frame. The canister includes an external air introducing pipe for introducing external air, and enables absorbing vaporized fuel generated in the fuel tank and purging the vaporized fuel to an inlet system of the internal combustion engine. The vehicle body cover covers the vehicle frame, the internal combustion engine and the fuel tank.

2. Description of the Background

Patent Literature 1 describes a well-known configuration that an external air introducing tubing, continuing to an external air introducing pipe of a canister for absorbing vaporized fuel generated in a fuel tank, is connected to a pipe-shaped frame member composing part of a vehicle body frame, and the interior of the frame member composes part of an external air introducing path.

CITATION LIST

Parent Literature

Patent Literature 1: Publication of Japan Patent No. 6145486

BRIEF SUMMARY

Incidentally, chances are that steam is released from the external air introducing pipe of the canister in a saturated state of the canister. When steam is released from the external air introducing pipe, it is desirable to quickly discharge the steam to the outside of a vehicle body. It is also desirable to dispose the end of the external air introducing tubing continuing to the external air introducing pipe in a position that the steam can be efficiently discharged to the outside of the vehicle body.

The present invention has been made in view of the aforementioned situation. It is an object of the present invention to provide a saddled vehicle configured to be capable of efficiently discharging steam, released from an external air introducing pipe of a canister, to the outside of the vehicle body.

To achieve the aforementioned object, the present invention sets the following configuration as a first characteristic. The present invention relates to a saddled vehicle including a vehicle body frame including at a front end thereof a head pipe supporting a steering handle so as to make the steering handle steerable;

an internal combustion engine supported by a lower part of the vehicle body frame;

a fuel tank supported by an upper part of the vehicle body frame;

a canister including an external air introducing pipe for introducing an external air, the canister enabling absorbing a vaporized fuel generated in the fuel tank and purging the vaporized fuel to an inlet system of the internal combustion engine; and a vehicle body cover covering the vehicle body frame, the internal combustion engine and the fuel tank;

wherein an external air introducing tubular pathway extends inside the vehicle body cover while continuing at one end thereof to the external air introducing pipe of the canister, an other end-side opened portion of the external air introducing tubular pathway being opened to an outside of the vehicle body cover while penetrating a through hole formed in the vehicle body cover.

Moreover, the present invention sets the following configuration as a second characteristic in addition to the configuration of the first characteristic. The other end-side opened portion of the external air introducing tubular pathway is disposed above the fuel tank.

The present invention sets the following configuration as a third characteristic in addition to one of the configurations of the first and second characteristics. The other end-side opened portion of the external air introducing tubular pathway is covered with a masking member. The masking member is attached to the vehicle body cover while forming at least one discharge pathway together with an outer surface of the vehicle body cover therebetween. The at least one discharge pathway communicates with the outside.

The present invention sets the following configuration as a fourth characteristic in addition to the configuration of the third characteristic. The masking member integrally includes a masking member main portion and a louver portion. The masking member main portion covers the other end-side opened portion of the external air introducing tubular pathway. The louver portion bulges sideward from the masking member main portion while forming the discharge pathway together with the outer surface of the vehicle body cover therebetween.

The present invention sets the following configuration as a fifth characteristic in addition to the configuration of the fourth characteristic. The vehicle body cover is formed in part by a fender that covers a wheel and includes a wall portion disposed below the louver portion. The wall portion is shaped to include an uppermost portion, a front slant portion and a rear slant portion. The uppermost portion is disposed below the discharge pathway. The front slant portion slants down forward from the uppermost portion. The rear slant portion slants down rearward from the uppermost portion.

The present invention sets the following configuration as a sixth characteristic in addition to any of the configurations of the third to fifth characteristics. A plurality of ribs are disposed to protrude from an inner surface of the masking member. The plurality of ribs guide a steam flowing thereto from the other end-side opened portion of the external air introducing tubular pathway. At least one rib of the plurality of ribs is formed in opposition to a flow direction of the steam flowing toward the discharge pathway.

The present invention sets the following configuration as a seventh characteristic in addition to the configuration of the sixth characteristic. The at least one rib is disposed to protrude from the inner surface of the masking member while extending from the masking member main portion to the louver portion.

Furthermore, the present invention sets the following configuration as an eighth characteristic in addition to any of the configurations of the third to fifth characteristics. At least one rib is disposed to protrude at least from an inner surface of the louver portion of the masking member.

According to the configuration of the first characteristic of the present invention, the external air introducing tubular pathway is opened to the outside of the vehicle body cover, while penetrating the through hole formed in the vehicle body cover. Hence, fresh air can be easily taken inside from the outside of the vehicle body cover, and in addition, even when steam is released from the canister, the steam can be effectively discharged not to the interior of the vehicle body cover but to the outside of the vehicle body cover.

Moreover, according to the second characteristic of the present invention, the external air introducing tubular pathway is opened above the fuel tank. Hence, external air can be easily taken inside, while impact of dust and so forth raised during traveling of the vehicle can be suppressed as much as possible. Besides, the external air introducing tubular pathway is set to have a relatively large tube length so as to have enough capacity to accumulate steam in the interior thereof.

According to the third characteristic of the present invention, the opened portion of the external air introducing tubular pathway is covered with the masking member, whereby aesthetic appearance can be enhanced. Besides, at least one discharge pathway, communicating with the outside, is formed between the masking member and the outer surface of the vehicle body cover, whereby a function of discharging steam to the outside can be maintained as well.

According to the fourth characteristic of the present invention, the masking member integrally includes the masking member main portion and the louver portion. The masking member main portion covers the opened portion of the external air introducing tubular pathway. The louver portion bulges sideward from the masking member main portion. Additionally, the discharge pathway is formed between the louver portion and the outer surface of the vehicle body cover. Hence, the discharge pathway is made difficult to be seen from outside, whereby aesthetic appearance is enhanced. In addition to this, the discharge pathway can be set to have a large flow-through area.

According to the fifth characteristic of the present invention, the fender, covering the front wheel, includes the wall portion disposed below the louver portion. The wall portion is composed of the uppermost portion, the front slant portion and the rear slant portion. The uppermost portion is disposed below the discharge pathway; the front slant portion slants down forward from the uppermost portion; and the rear slant portion slants down rearward from the uppermost portion. Hence, steam discharged from the discharge pathway is configured to smoothly flow inside the groove while the flow thereof branches back and forth without concentrating on one site.

According to the sixth characteristic of the present invention, the plurality of ribs are disposed to protrude from the inner surface of the masking member so as to guide steam flowing thereto from the external air introducing tubular pathway. At least one of the ribs is formed in opposition to the flow direction of the steam. Hence, the steam can be dispersed while flowing between the masking member and the vehicle body cover, whereby massive steam discharge from the discharge pathway can be avoided.

According to the seventh characteristic of the present invention, at least one rib is formed to extend from the masking member main portion to the louver portion. Hence, it is possible to inhibit increase in number of the ribs disposed to protrude from the masking member, reinforce the louver portion, and set directivity to the flow direction of the steam discharged from the discharge pathway.

Furthermore, according to the eighth characteristic of the present invention, at least one rib is disposed to protrude at least from the inner surface of the louver portion. Hence, it is possible to reinforce the louver portion and set directivity to the flow direction of steam discharged from the discharge pathway.

DETAILED DESCRIPTION

An embodiment of the present invention will be explained with reference to attached FIGS. 1 to 8. It should be noted that in the following explanation, the terms "up", "down", "front", "rear", "right" and "left" are defined as indicating directions seen from a rider riding on a saddled vehicle.

Figure 1:
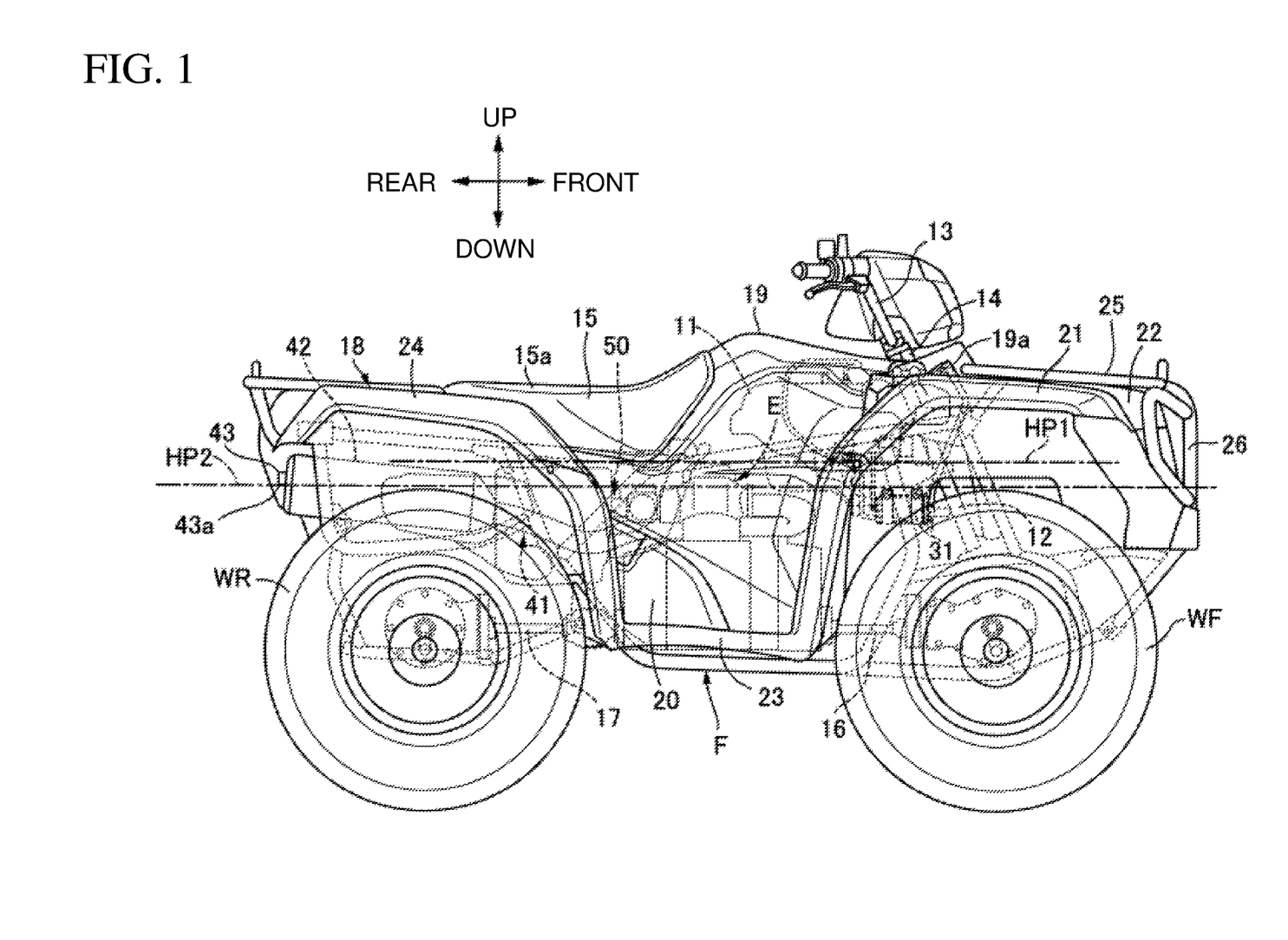
FIG. 1 is a right side view of a saddled vehicle.

First, as shown in FIG. 1, the present saddled vehicle is an all-terrain vehicle, and a vehicle body frame F thereof is formed by joining and welding a plurality of frame members including a plurality of metallic pipes. An internal combustion engine E and a fuel tank 11 are mounted to the vehicle body frame F. The fuel tank 11 stores fuel to be supplied to the internal combustion engine E, and is disposed above the internal combustion engine E.

Figure 2:
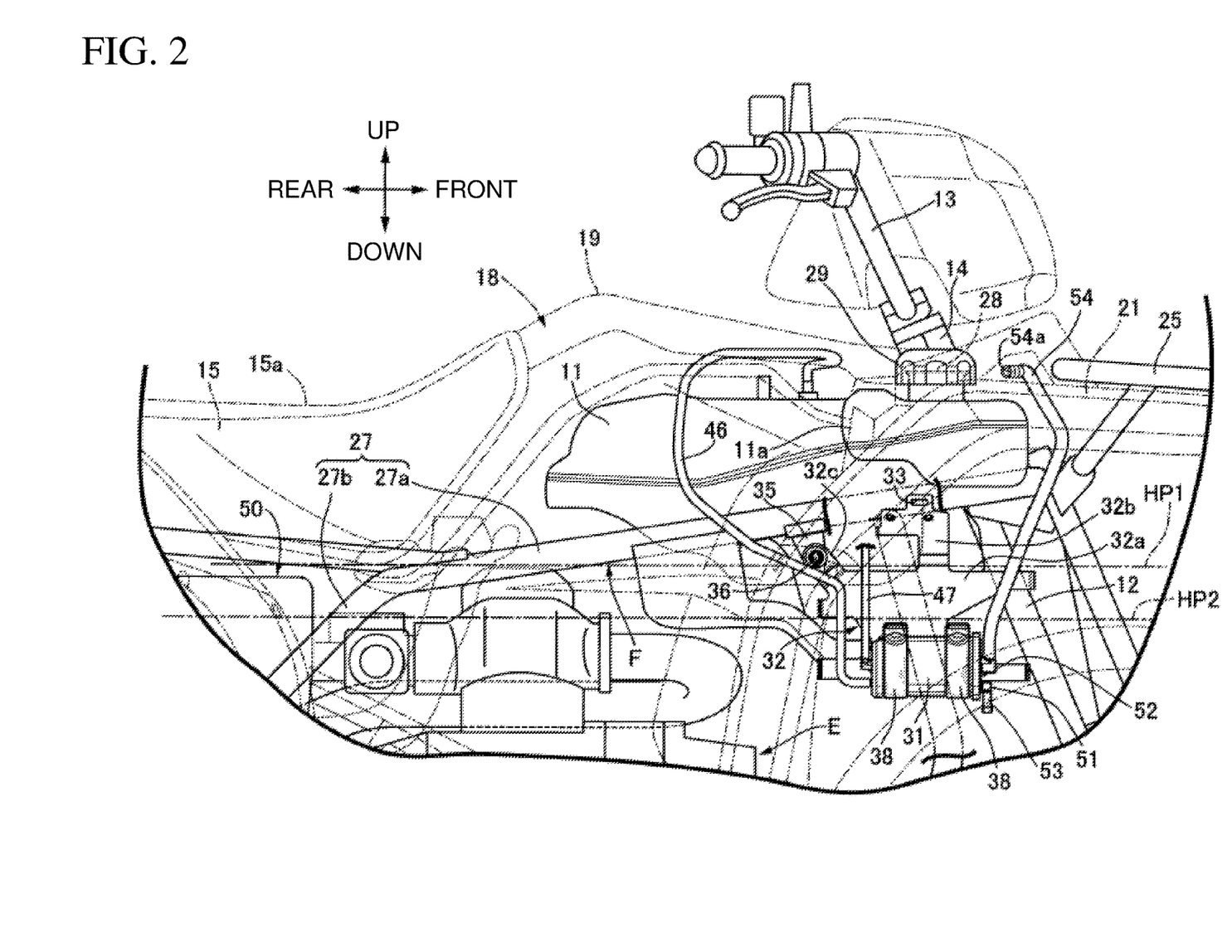
FIG. 2 is a right side view of major components of the saddled vehicle from which a vehicle body cover is omitted.

With reference to FIG. 2 together, a pair of right and left front wheels WF is suspended by a front part of the vehicle body frame F through a front suspension of an independent suspension type (not shown in the drawings), whereas a pair of right and left rear wheels WR is suspended by a rear part of the vehicle body frame F through a rear suspension of an independent suspension type (not shown in the drawings).

A steering shaft 12, slanting up rearward, is rotatably supported by a head pipe 14 included in the front end of the vehicle body frame F. A steering handle 13, made in the shape of a bar, is attached to the upper end of the steering shaft 12 in order to perform a steering operation for the right and left front wheels WF.

The internal combustion engine E is mounted to a lower part of the vehicle body frame F, while being disposed behind the steering shaft 12 and the steering handle 13. The fuel tank 11, disposed above the internal combustion engine E, is supported by an upper part of the vehicle body frame F. Additionally, a rider seat 15 is supported by the vehicle body frame F, while being disposed above the internal combustion engine E and behind the fuel tank 11.

The internal combustion engine E exerts a power for driving the pair of right and left front wheels WF and the pair of right and left rear wheels WR. A front-side drive shaft 16, driving the pair of right and left front wheels WF, extends forward from the internal combustion engine E, whereas a rear-side drive shaft 17, driving the pair of right and left rear wheels WR, extends rearward from the internal combustion engine E.

The vehicle body frame F, the fuel tank 11, the internal combustion engine E, the front wheels WF and the rear wheels WR are covered with a vehicle body cover 18. The vehicle body cover 18 includes a tank cover 19, a pair of right and left side covers 20, a pair of right and left front fenders 21, a front cover 22, a pair of right and left steps 23, and a pair of right and left rear fenders 24. The tank cover 19 covers the fuel tank 11 from above. The right and left side covers 20 continue to both the right and left sides of the tank cover 19, respectively, and are disposed in positions to cover the internal combustion engine E from lateral sides. The right and left front fenders 21 are disposed in positions to cover the right and left front wheels WF, respectively. The front cover 22 is disposed in a position connecting therethrough the right and left front fenders 21. The right and left steps 23 are disposed in continuation to the lower ends of the side covers 20 and the lower parts of the rear ends of the front fenders 21, respectively, so as to enable a rider seated on the rider seat 15 to put rider's feet thereon. The right and left rear fenders 24 continue to the rear ends of the side covers 20 and those of the steps 23, respectively, and are disposed in positions to cover the right and left rear wheels WR, respectively.

A front carrier 25 is disposed above the front cover 22 and front parts of the right and left front fenders 21. The front carrier 25 is disposed in continuation to a front protector 26 attached to the front end of the vehicle body frame F, while covering the front fenders 21 and the front cover 22 from ahead.

The fuel tank 11 is supported by a pair of right and left frame members 27 composing part of the front part of the vehicle body frame F. Each frame member 27 includes a front-side slant portion 27a and a rear-side slant portion 27b. The front-side slant portion 27a slants down rearward. The rear-side slant portion 27b integrally continues to the rear end of the front-side slant portion 27a at a steeper angle than the front-side slant portion 27a. The fuel tank 11 is supported on the front-side slant portions 27a of the pair of right and left frame members 27.

Figure 3:
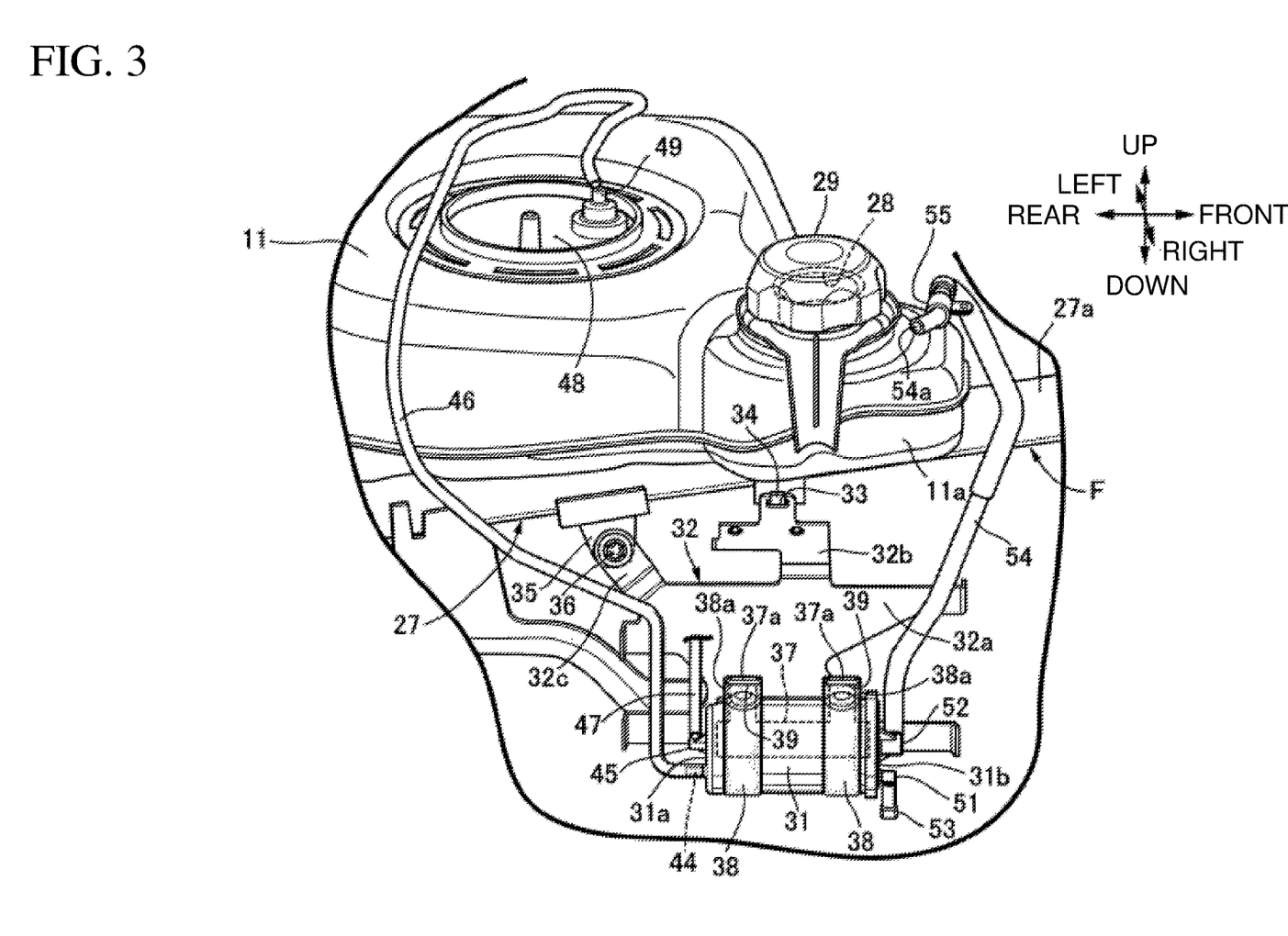
FIG. 3 is a perspective view of the major components shown in FIG. 2.
Figure 4:
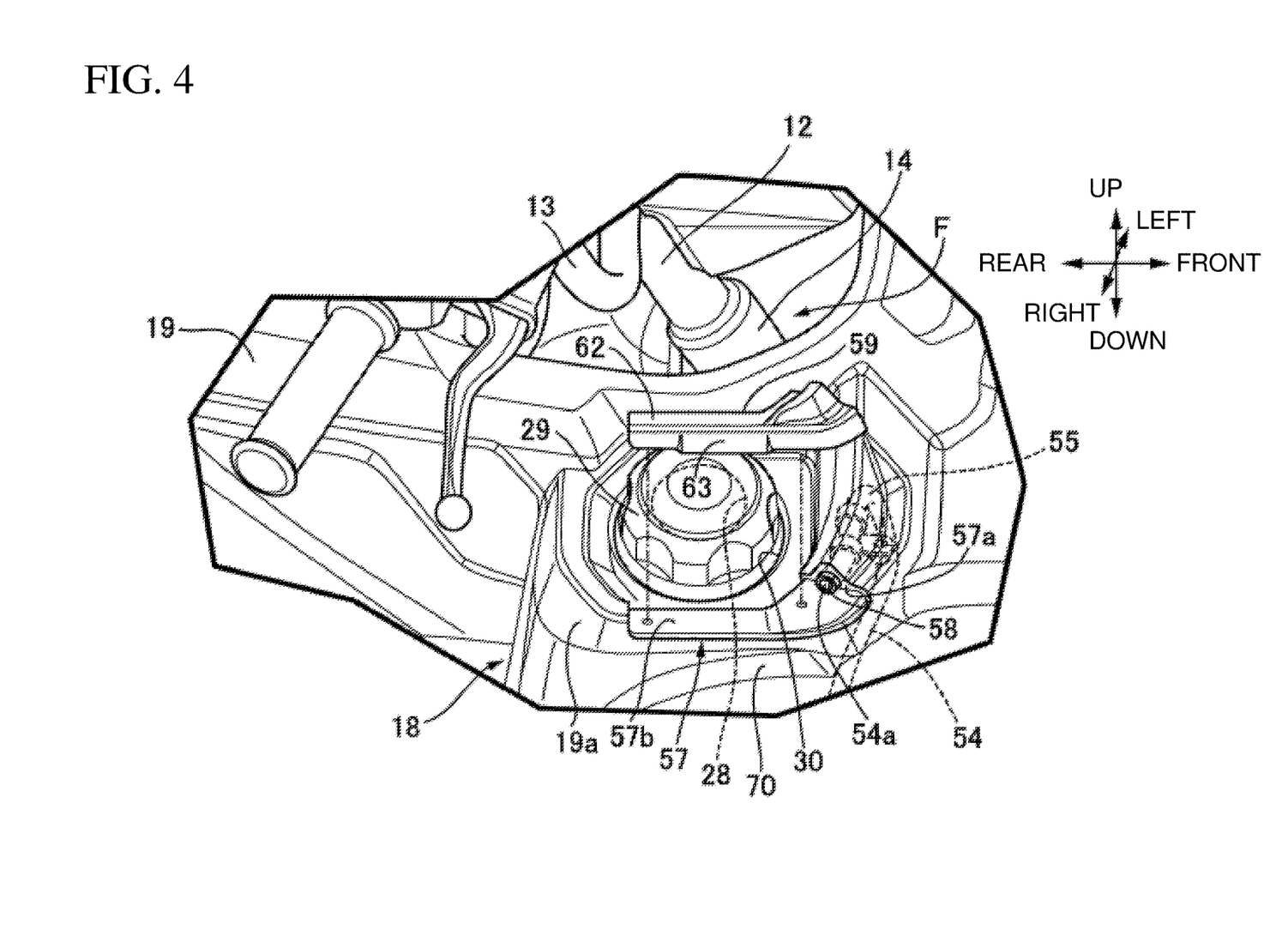
FIG. 4 is an exploded perspective view of the vicinity of an oil filler port from which a masking member is detached.
Figure 5:
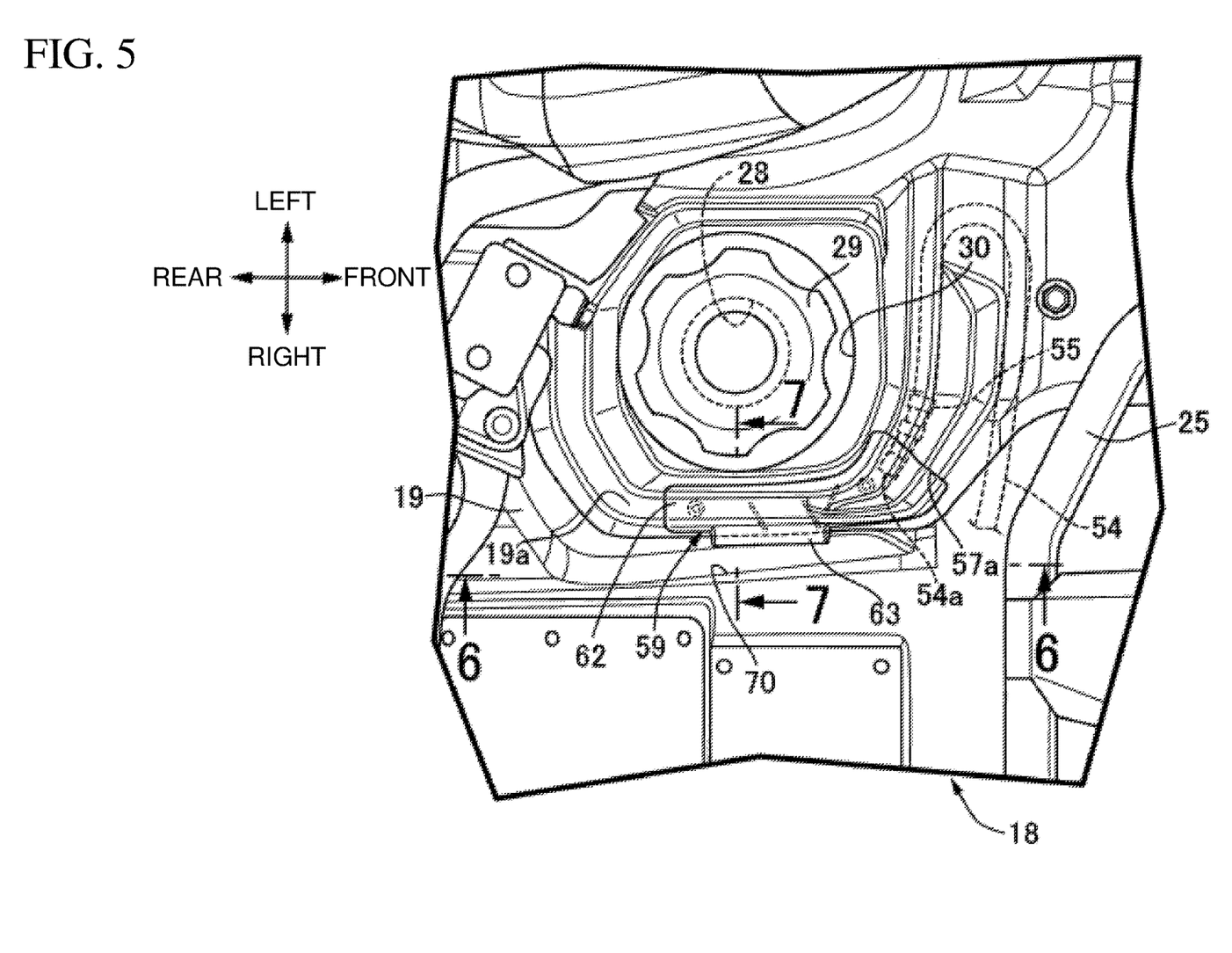
FIG. 5 is a plan view of the vicinity of the oil filler port to which the masking member is attached.

With reference to FIGS. 3 to 5 together, the fuel tank 11 includes a bulging portion 11a integrated with the right side of a vehicle back-and-forth directionally front part thereof. The bulging portion 11a bulges rightward from a position directly above the front-side slant portion 27a of the vehicle width directionally right-side one of the pair of right and left frame members 27. Additionally, the fuel tank 11 includes an oil filler port 28 on the upper surface of the bulging portion 11a. The oil filler port 28 is disposed at a position, eccentric rightward from the vehicle width directional center of the fuel tank 11, in the front part of the fuel tank 11. The oil filler port 28 is closed by an oil filler cap 29 detachably attached thereto. Besides, the tank cover 19 includes a circular through hole 30, through which the oil filler port 28 and the oil filler cap 29 face outside.

With attention to FIGS. 2 and 3, vaporized fuel, generated in the fuel tank 11, is absorbed in a canister 31. The canister 31 is supported by the front-side slant portion 27a of the right-side frame member 27 through a stay 32, while being disposed below the bulging portion 11a of the fuel tank 11.

The stay 32 integrally includes a stay main portion 32a, a front-side support arm portion 32b and a rear-side support arm portion 32c. The stay main portion 32a extends in the vehicle back-and-forth direction. The front-side support arm portion 32b extends upward from a back-and-forth directionally intermediate part of the stay main portion 32a. The rear-side support arm portion 32c extends slanting rearward upward from the rear part of the stay main portion 32a.

The front-side support arm portion 32b includes an engaging hole 33 in an upper part thereof. An engaging pawl 34, fixedly disposed on the front-side slant portion 27a of the right-side frame member 27, is engaged with the engaging hole 33. Additionally, the rear-side support arm portion 32c is fastened at the upper end thereof, by a bolt 36, to a support protrusion 35 fixedly disposed on the front-side slant portion 27a of the right-side frame member 27.

The canister 31 is supported by the stay 32, while taking a posture that the lengthwise direction thereof is arranged along the vehicle back-and-forth direction. An attachment plate 37 is fixedly attached to a lower part of the stay main portion 32a of the stay 32. The attachment plate 37 includes a pair of hooks 37a in an upper part thereof. The hooks 37a, each having an approximately L-shape, are disposed at an interval in the vehicle back-and-forth direction. On the other hand, a pair of rubbers 38, each having an annular shape, is attached to the canister 31 so as to surround the canister 31. The pair of rubbers 38 includes a pair of protruding portions 38a integrally protruding therefrom, and a pair of slits 39 is formed in the pair of protruding portions 38a. The hooks 37a are inserted into the slits 39, respectively, whereby the canister 31 is supported by the stay 32.

Incidentally, an exhaust muffler 42, forming a downstream end of an exhaust system 41 of the internal combustion engine E, is disposed below the rider seat 15 and between the pair of right and left rear wheels WR. The canister 31 is disposed below a lower end 43a of an exhaust outlet 43 included in the rear end of the exhaust muffler 42. In other words, the lower end 43a of the exhaust outlet 43 is disposed below a first horizontal plane HP1 passing through the lowermost part of a seat portion 15a of the rider seat 15. The canister 31 is disposed below a second horizontal plane HP2 passing through the lower end 43a of the exhaust outlet 43.

The canister 31 includes end walls 31a and 31b on the both lengthwise ends thereof. A charge pipe 44 and a purge pipe 45 are disposed on and protrude from the end wall 31a facing rearward in the vehicle back-and-forth direction. A charging hose 46, continuing at one end thereof to the charge pipe 44, extends between the fuel tank 11 and the tank cover 19 so as to reach a middle part of the fuel tank 11. Additionally, a support plate 48 is attached to a middle part of the upper surface of the fuel tank 11. The support plate 48 has a circular shape, and supports a fuel pump (not shown in the drawings) arranged and mounted to the interior of the fuel tank 11. The charging hose 46 is connected at the other end thereof to a vaporized fuel connecting pipe 49. The vaporized fuel connecting pipe 49 is disposed on and upwardly protrudes from the support plate 48 so as to lead the vaporized fuel generated in the fuel tank 11.

Additionally, a purge hose 47, connecting at one end thereof to the purge pipe 45, extends therefrom toward the internal combustion engine E in the interior of the vehicle body cover 18, and is connected at the other end thereof to an intake system 50 (see FIGS. 1 and 2) of the internal combustion engine E.

A drain pipe 51 is disposed on and protrudes from a lower part of the end wall 31b facing forward in the vehicle back-and-forth direction as one of the end walls 31a and 31b included on the both lengthwise ends of the canister 31. Besides, an external air introducing pipe 52 is disposed on and protrudes from the end wall 31b, while being disposed above the drain pipe 51. The external air introducing pipe 52 prevents a situation that the pressure in the canister 31 becomes negative and purge resistance increases in purging the vaporized fuel to the intake system 50 by the purge hose 47.

A sealing cap 53 is detachably attached to the drain pipe 51. Additionally, an external air introducing hose 54, which is an external air introducing tubular pathway, continues at one end thereof to the external air introducing pipe 52. The external air introducing hose 54 extends to the upper surface of the bulging portion 11a of the fuel tank 11 such that an other end-side opened portion 54a thereof is disposed in the surroundings of the oil filler port 28 disposed on the upper part of the fuel tank 11. The external air introducing hose 54 is held at the upstream-side end thereof by a holder 55 fixedly attached to the upper surface of the bulging portion 11a, whereby the other end-side opened portion 54a is disposed above the bulging portion 11a of the fuel tank 11 while being disposed in the surroundings of the oil filler port 28.

Figure 6:
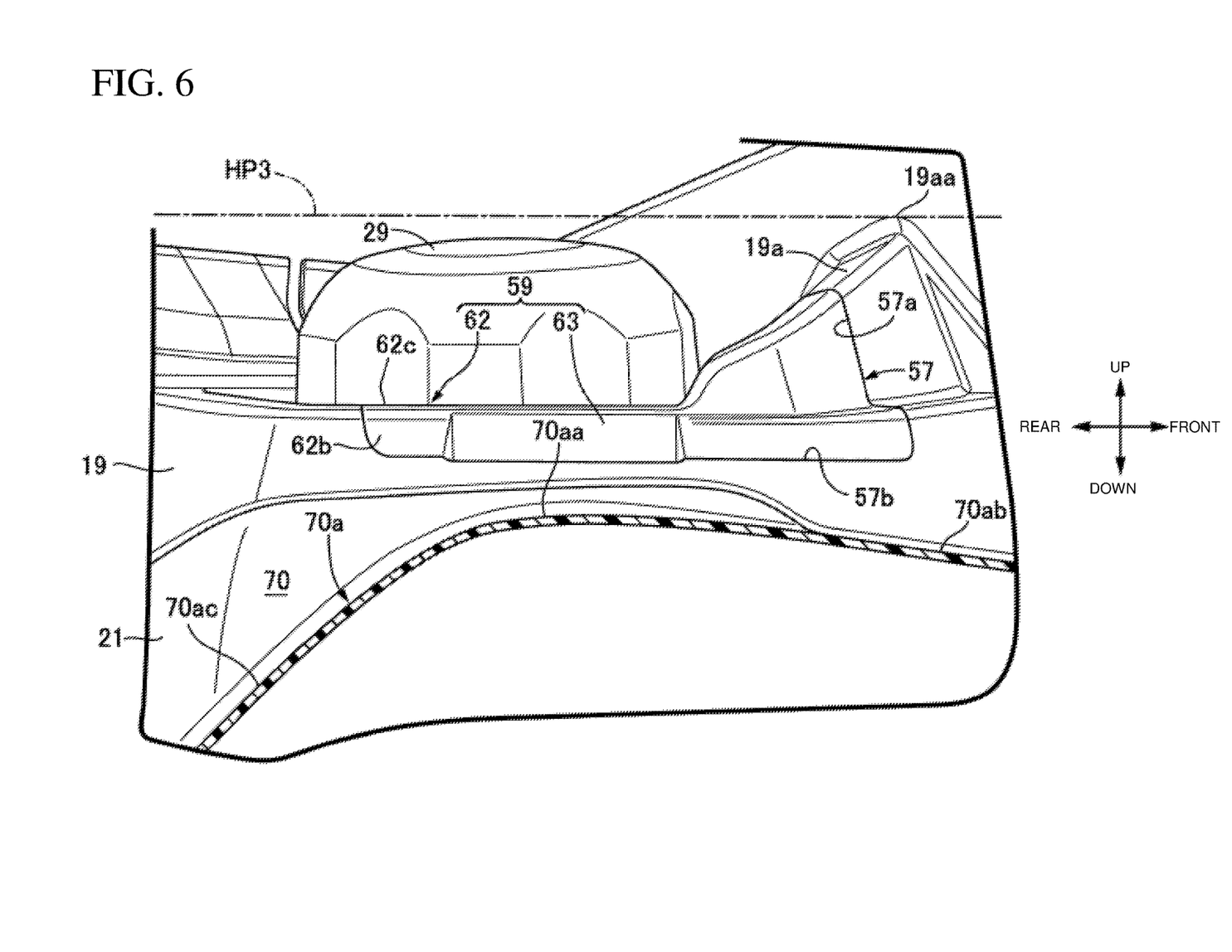
FIG. 6 is a cross-sectional view of FIGS. 5 and 7 taken along line 6-6.

With reference to FIG. 6 together, a raised wall portion 19a is integrated with the tank cover 19 raised upward so as to surround the oil filler cap 29. The raised wall portion 19a is shaped such that the height thereof gradually increases forward in the vehicle back-and-forth direction. An upper end highest portion 19aa on the foremost end of the raised wall portion 19a is located above the oil filler cap 29. In other words, the upper end of the oil filler cap 29 is disposed below a third horizontal plane HP3 passing through the upper end highest portion 19aa.

The raised wall portion 19a is cut out in part on the right side in the vehicle width direction (i.e., on the right-side front fender 21 side) so as to form a recessed portion 57 opened upward. Besides, the recessed portion 57 includes a through hole 58 having a circular shape in a front end wall 57a thereof. The other end of the external air introducing hose 54 penetrates the through hole 58, while the other end-side opened portion 54a is opened to the outside of the tank cover 19 (i.e., the vehicle body cover 18).

Figure 7:
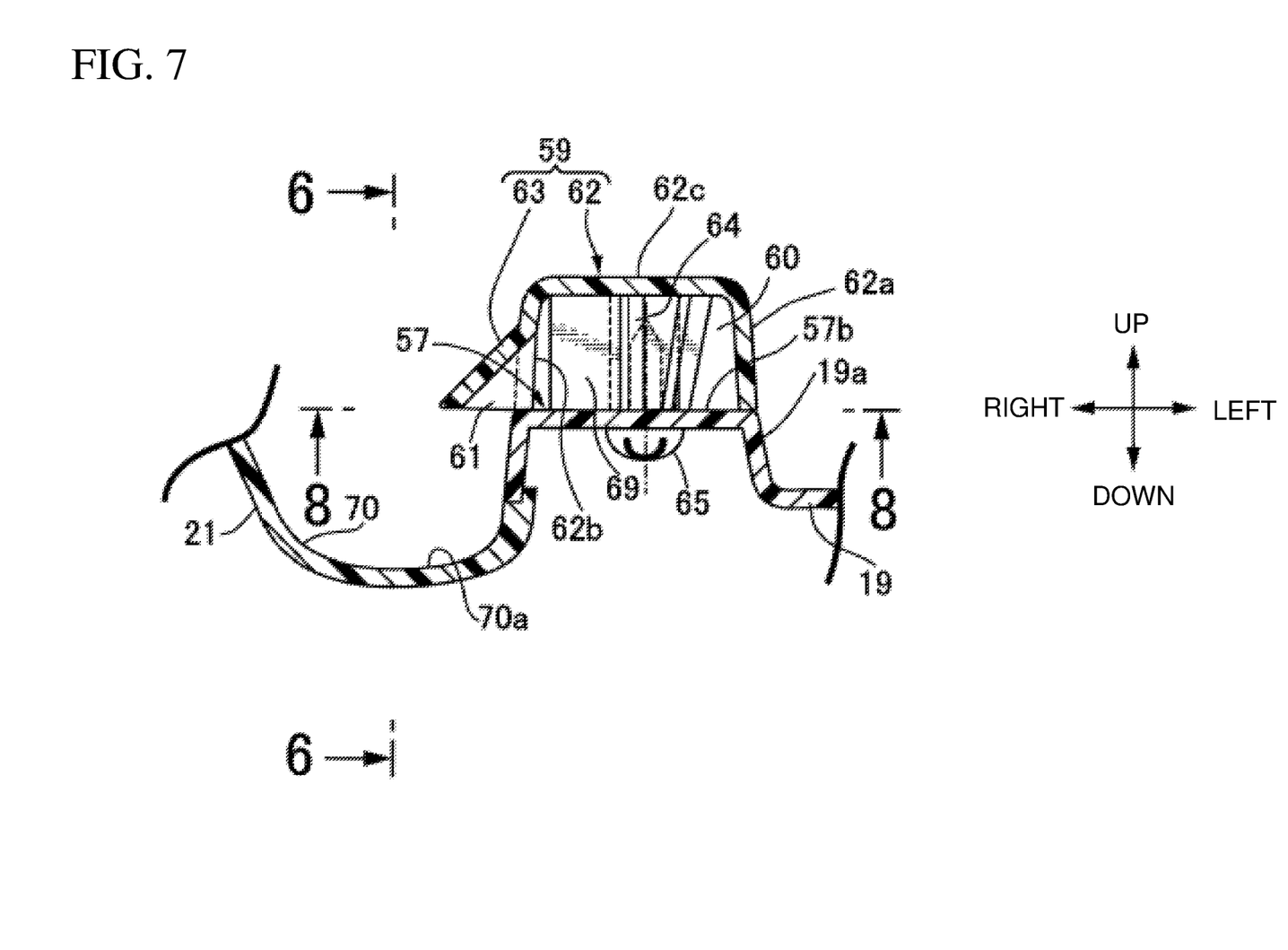
FIG. 7 is a view as seen from line 7-7 in FIG. 5.
Figure 8:
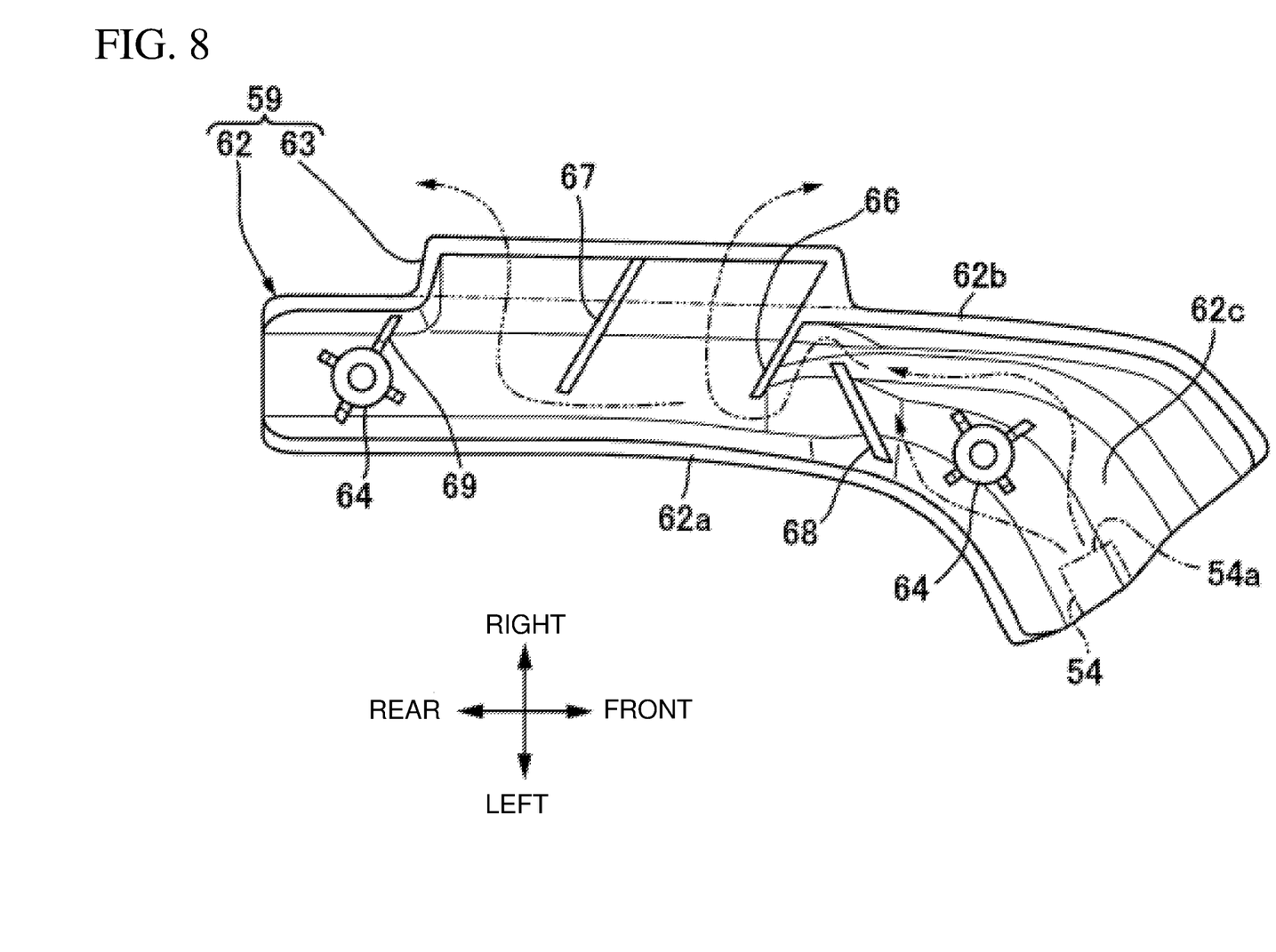
FIG. 8 is a cross-sectional view of FIG. 7 taken along line 8-8.

With reference to FIGS. 7 and 8 together, a masking member 59 is a member for covering the other end-side opened portion 54a of the external air introducing hose 54, and is attached to the raised wall portion 19a of the tank cover 19 included in the vehicle body cover 18, while closing the recessed portion 57. A pathway 60 and a discharge pathway 61 are formed between the masking member 59 and the outer surface of the raised wall portion 19a. The pathway 60 communicates with the other end-side opened portion 54a, whereas the discharge pathway 61 communicates with not only the pathway 60 but also the outside.

The masking member 59 is made of synthetic resin so as to integrally include a masking member main portion 62 and a louver portion 63. The masking member main portion 62 covers the other end-side opened portion 54a of the external air introducing hose 54, and forms the pathway 60 together with a lateral surface of the recessed portion 57 therebetween. The louver portion 63 bulges sideward from the masking member main portion 62 toward the right-side front fender 21, while forming the discharge pathway 61 together with a bottom wall 57b of the recessed portion 57 therebetween.

The masking member main portion 62 is shaped to integrally include a first sidewall portion 62a, a second sidewall portion 62b and a ceiling wall portion 62c. The first sidewall portion 62a is connected to the inner peripheral surface of the raised wall portion 19a. The second sidewall portion 62b is connected to the outer peripheral surface of the raised wall portion 19a. The ceiling wall portion 62c connects the first sidewall portion 62a and the second sidewall portion 62b, while being opposed to the bottom wall 57b of the recessed portion 57. On the other hand, the louver portion 63 is shaped to bulge sideward from a vehicle back-and-forth directionally intermediate part of the second sidewall portion 62b.

Two attachment bosses 64 are disposed to integrally protrude from the inner surface of the ceiling wall portion 62c of the masking member main portion 62 at two positions located at an interval in the vehicle back-and-forth direction. The attachment bosses 64 make contact with the bottom wall 57h of the recessed portion 57. Screw members 65 are inserted through the bottom wall 57b from below, and are screwed and fastened into the attachment bosses 64, respectively. Accordingly, the masking member main portion 62 (i.e., the masking member 59) is attached to the raised wall portion 19a of the tank cover 19.

The masking member 59 includes at least one rib disposed to protrude at least from the inner surface of the louver portion 63. In the present embodiment, the masking member 59 includes first and second ribs 66 and 67 aligned along the vehicle back-and-forth direction. The first rib 66 is disposed on the front side, whereas the second rib 67 is disposed behind the first rib 66.

Incidentally, the masking member 59 includes a plurality of (e.g., four) ribs 66, 67, 68 and 69 including the first and second ribs 66 and 67 disposed to protrude from the inner surface thereof. The ribs 66, 67, 68 and 69 guide steam flowing into the pathway 60 through the other end-side opened portion 54a of the external air introducing hose 54.

In other words, the third rib 68 is disposed between the first rib 66 and vehicle back-and-forth directionally front-side one of the pair of attachment bosses 64. The third rib 68 is disposed to integrally protrude from the ceiling wall portion 62c of the masking member main portion 62. Also, the third rib 68 continues to the first sidewall portion 62a of the masking member main portion 62, which is a sidewall portion disposed on the opposite side of the second sidewall portion 62b on which the louver portion 63 is disposed, and extends toward the second side wall portion 62b. Moreover, the fourth rib 69 is disposed behind the second rib 67 in the vehicle back-and-forth direction. The fourth rib 69 is disposed to integrally protrude from the ceiling wall portion 62c of the masking member main portion 62. Also, fourth rib 69 extends toward the second sidewall portion 62b from vehicle back-and-forth directionally rear-side one of the pair of attachment bosses 64.

Furthermore, at least one of the first to fourth ribs 66 to 69 (the first and second ribs 66 and 67 in the present embodiment) is shaped in opposition to the flow direction of steam flowing toward the discharge pathway 61 in the interior of the pathway 60. The third rib 68 is disposed along the flow direction of steam flowing toward the discharge pathway 61 in the interior of the pathway 60, whereas the fourth rib 69 is disposed in parallel to the first and second ribs 66 and 67. With the aforementioned layout of the first to fourth ribs 66 to 69 in the interior of the pathway 60, the pathway 60 is made in the form of a labyrinth pathway. Consequently, steam flows in the interior of the pathway 60, while changing zigzag the flow direction thereof.

Besides, at least one of the first to fourth ribs 66 to 69 (i.e., the first and second ribs 66 and 67), disposed in opposition to the flow direction of steam flowing toward the discharge pathway 61 in the interior of the pathway 60, is disposed to protrude from the inner surface of the masking member 59, while extending from the masking member main portion 62 to the louver portion 63.

Incidentally, the right-side front fender 21 includes a wall portion 70a. The wall portion 70a composes part of the front fender 21, and is disposed below the louver portion 63. In the present embodiment, as clearly shown in FIGS. 6 and 7, the right-side front fender 21 includes a groove 70 in a part thereof corresponding to the louver portion 63. The groove 70 extends in the vehicle back-and-forth direction and is opened upward. The wall portion 70a is a bottom wall portion of the groove 70. Besides, the wall portion 70a is shaped to be composed of an uppermost portion 70aa, a front slant portion 70ab and a rear slant portion 70ac. The uppermost portion 70aa is disposed below the discharge pathway 61 (i.e., the louver portion 63). The front slant portion 70ab slants down forward from the uppermost portion 70aa. The rear slant portion 70ac slants down rearward from the uppermost portion 70aa.

Next, advantageous effects of the present embodiment will be explained. The exhaust muffler 42, forming the downstream end of the exhaust system 41 of the internal combustion engine E, is disposed below the rider seat 15. The canister 31 is disposed below the lower end 43a of the exhaust outlet 43 of the exhaust muffler 42. The sealing cap 53 is detachably attached to the drain pipe 51 disposed on the lower part of the canister 31. Hence, despite that the canister 31 is disposed in a relatively low position, intrusion of rainwater into the canister 31 can be prevented with the simple structure that the sealing cap 53 is attached to the drain pipe 51 of the canister 31.

Additionally, the external air introducing hose 54 extends inside the vehicle body cover 18 while continuing at one end thereof to the external air introducing pipe 52 of the canister 31. The other-end side opened portion 54a thereof is opened to the outside of the vehicle body cover 18 while penetrating the through hole 58 formed in the tank cover 19 of the vehicle body cover 18. Hence, fresh air can be easily taken inside from the outside of the vehicle body cover 18, and in addition, even when steam is released from the canister 31, the steam can be effectively discharged not to the interior of the vehicle body cover 18 but to the outside of the vehicle body cover 18.

Moreover, the other end-side opened portion 54a of the external air introducing hose 54 is disposed above the bulging portion 11a of the fuel tank 11. Hence, external air can be easily taken inside, while impact of dust and so forth raised during traveling of the vehicle can be suppressed as much as possible. Besides, the external air introducing hose 54 is set to have a relatively large tube length so as to have enough capacity to accumulate steam in the interior thereof.

Moreover, the other end-side opened portion 54a of the external air introducing hose 54 is covered with the masking member 59. The masking member 59 is attached to the tank cover 19 of the vehicle body cover 18, while forming at least one discharge pathway 61 together with the outer surface of the vehicle body cover 18 therebetween. The at least one discharge pathway 61 communicates with the outside. Hence, the other end-side opened portion 54a of the external air introducing hose 54 is covered with the masking member 59, whereby aesthetic appearance can be enhanced, and a function of discharging steam to the outside can be maintained as well.

Moreover, the masking member 59 integrally includes the masking member main portion 62 and the louver portion 63. The masking member main portion 62 covers the other end-side opened portion 54a of the external air introducing hose 54. The louver portion 63 bulges sideward from the masking member main portion 62, while forming the discharge pathway 61 together with the outer surface of the tank cover 19 of the vehicle body cover 18 therebetween. Hence, the discharge pathway 61 is made difficult to be seen from outside, whereby aesthetic appearance is enhanced. In addition to this, the discharge pathway 61 can be set to have a large flow-through area.

Moreover, the vehicle body cover 18 is formed in part by the right-side front fender 21 covering the front wheel WF, and the right-side front fender 21 includes the wall portion 70a disposed below the louver portion 63. The wall portion 70a is shaped to be composed of the uppermost portion 70aa, the front slant portion 70ab and the rear slant portion 70ac. The uppermost portion 70aa is disposed below the discharge pathway 61; the front slant portion 70ab slants down forward from the uppermost portion 70aa; and the rear slant portion 70ac slants down rearward from the uppermost portion 70aa. Hence, steam discharged from the discharge pathway 61 is configured to smoothly flow inside the groove 70 while the flow thereof branches back and forth without concentrating on one site.

Moreover, a plurality of ribs, for instance, the first to fourth ribs 66, 67, 68 and 69 are disposed to protrude from the inner surface of the masking member 59 so as to guide steam flowing thereto from the other end-side opened portion 54a of the external air introducing hose 54. At least one of the ribs 66 to 69 (the first and second ribs 66 and 67 in the present embodiment) is formed in opposition to the flow direction of the steam flowing toward the discharge pathway 61. Hence, the steam can be dispersed while flowing between the masking member 59 and the vehicle body cover 18, whereby massive steam discharge from the discharge pathway 61 can be avoided.

Besides, the first and second ribs 66 and 67 are disposed to protrude from the inner surface of the masking member 59, while extending from the masking member main portion 62 to the louver portion 63. Hence, it is possible to inhibit increase in number of the ribs 66 to 69 disposed to protrude from the masking member 59, reinforce the louver portion 63, and set directivity to the flow direction of the steam discharged from the discharge pathway 61.

One embodiment of the present invention has been explained above. However, the present invention is not limited to the aforementioned embodiment, and a variety of design changes can be made without departing from the present invention described in claims.

REFERENCE SIGNS LIST

11 . . . Fuel tank
13 . . . Steering handle
14 . . . Head pipe
18 . . . Vehicle body cover
21 . . . Front fender
31 . . . Canister
50 . . . Intake system
52 . . . External air introducing pipe
54 . . . External air introducing hose as external air introducing tubular pathway
54a . . . Other end-side opened portion
58 . . . Through hole
59 . . . Masking member
61 . . . Discharge pathway
62 . . . Masking member main portion
63 . . . Louver portion
66, 67, 68, 69 . . . Rib
70a . . . Wall portion
70aa . . . Uppermost portion
70ab . . . Front slant portion 70ac . . . Rear slant portion
E . . . Internal combustion engine
F . . . Vehicle body frame
WF . . . Front wheel

What is claimed is:

1. A saddled vehicle comprising:
a vehicle body frame including at a front end thereof a head pipe supporting a steering handle so as to make the steering handle steerable;
an internal combustion engine supported by a lower part of the vehicle body frame;
a fuel tank supported by an upper part of the vehicle body frame;
a canister including an external air introducing pipe for introducing an external air, the canister enabling absorbing a vaporized fuel generated in the fuel tank and purging the vaporized fuel to an inlet system of the internal combustion engine;
a vehicle body cover covering the vehicle body frame, the internal combustion engine and the fuel tank, the vehicle body cover having a through hole; and
an external air introducing tubular pathway extending inside the vehicle body cover while continuing at one end thereof to the external air introducing pipe of the canister, the external air introducing tubular pathway having an other end-side opened portion being opened to an outside of the vehicle body cover while penetrating the through hole such that vapor from the canister is directly discharged to outside air.

2. The saddled vehicle according to claim 1, wherein the other end-side opened portion of the external air introducing tubular pathway is disposed above the fuel tank.

3. The saddled vehicle according to claim 2, wherein the other end-side opened portion of the external air introducing tubular pathway is covered with a masking member, the masking member being attached to the vehicle body cover while forming at least one discharge pathway together with an outer surface of the vehicle body cover therebetween, the at least one discharge pathway communicating with the outside.

4. The saddled vehicle according to claim 3, wherein the masking member integrally includes a masking member main portion and a louver portion, the masking member main portion covering the other end-side opened portion of the external air introducing tubular pathway, the louver portion bulging sideward from the masking member main portion while forming the discharge pathway together with the outer surface of the vehicle body cover therebetween.

5. The saddled vehicle according to claim 4, wherein the vehicle body cover is formed in part by a fender covering a wheel, the fender including a wall portion disposed below the louver portion, the wall portion being shaped to include an uppermost portion, a front slant portion and a rear slant portion, the uppermost portion being disposed below the discharge pathway, the front slant portion slanting down forward from the uppermost portion, the rear slant portion slanting down rearward from the uppermost portion.

6. The saddled vehicle according to claim 1, wherein the other end-side opened portion of the external air introducing tubular pathway is covered with a masking member, the masking member being attached to the vehicle body cover while forming at least one discharge pathway together with an outer surface of the vehicle body cover therebetween, the at least one discharge pathway communicating with the outside.

7. The saddled vehicle according to claim 6, wherein the masking member integrally includes a masking member main portion and a louver portion, the masking member main portion covering the other end-side opened portion of the external air introducing tubular pathway, the louver portion bulging sideward from the masking member main portion while forming the discharge pathway together with the outer surface of the vehicle body cover therebetween.

8. The saddled vehicle according to claim 7, wherein the vehicle body cover is formed in part by a fender covering a wheel, the fender including a wall portion disposed below the louver portion, the wall portion being shaped to include an uppermost portion, a front slant portion and a rear slant portion, the uppermost portion being disposed below the discharge pathway, the front slant portion slanting down forward from the uppermost portion, the rear slant portion slanting down rearward from the uppermost portion.

9. The saddled vehicle according to claim 8, wherein a plurality of ribs are disposed to protrude from an inner surface of the masking member, the plurality of ribs guiding a steam flowing thereto from the other end-side opened portion of the external air introducing tubular pathway, at least one rib of the plurality of ribs being formed in opposition to a flow direction of the steam flowing toward the discharge pathway.

10. The saddled vehicle according to claim 9, wherein the at least one rib is disposed to protrude from the inner surface of the masking member while extending from the masking member main portion to the louver portion.

11. The saddled vehicle according to claim 8, wherein at least one rib is disposed to protrude at least from an inner surface of the louver portion of the masking member.

12. The saddled vehicle according to claim 7, wherein a plurality of ribs are disposed to protrude from an inner surface of the masking member, the plurality of ribs guiding a steam flowing thereto from the other end-side opened portion of the external air introducing tubular pathway, at least one rib of the plurality of ribs being formed in opposition to a flow direction of the steam flowing toward the discharge pathway.

13. The saddled vehicle according to claim 12, wherein the at least one rib is disposed to protrude from the inner surface of the masking member while extending from the masking member main portion to the louver portion.

14. The saddled vehicle according to claim 7, wherein at least one rib is disposed to protrude at least from an inner surface of the louver portion of the masking member.

15. The saddled vehicle according to claim 6, wherein a plurality of ribs are disposed to protrude from an inner surface of the masking member, the plurality of ribs guiding a steam flowing thereto from the other end-side opened portion of the external air introducing tubular pathway, at least one rib of the plurality of ribs being formed in opposition to a flow direction of the steam flowing toward the discharge pathway.

16. The saddled vehicle according to claim 15, wherein the at least one rib is disposed to protrude from the inner surface of the masking member while extending from the masking member main portion to the louver portion.

17. The saddled vehicle according to claim 6, wherein at least one rib is disposed to protrude at least from an inner surface of the louver portion of the masking member.

18. The saddled vehicle according to claim 1, wherein the fuel tank is arranged above the internal combustion engine.

19. The saddled vehicle according to claim 1, further comprising:

a drain pipe extending from the canister;
a purge hose extending from the canister to an intake of the internal combustion engine; and
a charge pipe extending from the canister to the fuel tank.

\* \* \* \* \*